(12) United States Patent
Edwards et al.

(10) Patent No.: US 7,433,915 B2
(45) Date of Patent: Oct. 7, 2008

(54) SYSTEM AND METHOD FOR CONTROLLING COMMUNICATION

(75) Inventors: Warren Keith Edwards, San Francisco, CA (US); Mark Webster Newman, San Francisco, CA (US); Trevor Smith, San Francisco, CA (US); Jana Zdislava Sedivy, Palo Alto, CA (US); Karen Marcelo, San Francisco, CA (US); Shahram Izadi, Bicester (GB); Jason Hong, Berkeley, CA (US)

(73) Assignee: Xerox Corporation, Norwalk, CT (US)

( * ) Notice: Subject to any disclaimer, the term of this patent is extended or adjusted under 35 U.S.C. 154(b) by 606 days.

(21) Appl. No.: 10/212,376

(22) Filed: Aug. 1, 2002

(65) Prior Publication Data

US 2004/0024809 A1   Feb. 5, 2004

(51) Int. Cl.
*G06F 15/16* (2006.01)
*G06F 3/00* (2006.01)
(52) U.S. Cl. ....................... 709/203; 719/316
(58) Field of Classification Search ................. 709/203
See application file for complete search history.

(56) References Cited

U.S. PATENT DOCUMENTS

| | | | | |
|---|---|---|---|---|
| 6,032,208 | A * | 2/2000 | Nixon et al. | 710/64 |
| 6,085,030 | A * | 7/2000 | Whitehead et al. | 709/203 |
| 6,219,703 | B1 * | 4/2001 | Nguyen et al. | 709/224 |
| 6,230,160 | B1 * | 5/2001 | Chan et al. | 707/103 X |
| 6,687,698 | B1 * | 2/2004 | Nixon et al. | 707/10 |
| 2001/0037476 | A1 * | 11/2001 | Yamamoto | 714/37 |
| 2002/0112058 | A1 * | 8/2002 | Weisman et al. | 709/227 |
| 2003/0051084 | A1 * | 3/2003 | Rosen | 710/72 |
| 2003/0105833 | A1 * | 6/2003 | Daniels et al. | 709/219 |
| 2003/0182467 | A1 * | 9/2003 | Jensen et al. | 709/317 |
| 2005/0267935 | A1 * | 12/2005 | Gandhi et al. | 709/203 |

OTHER PUBLICATIONS

U.S. Appl. No. 09/838,933, filed Apr. 20, 2001 by Edwards et al., titled "System and Method for Enabling Communication Among Arbitrary Components."
U.S. Appl. No. 10/052,585, filed Jan. 23, 2002 by Newman et al., titled "System and Method for Providing Context Information."
U.S. Appl. No. 10/058,268, filed Jan. 29, 2002 by Edwards et al., titled "System and Method for Enabling Arbitrary Components to Transfer Data Between Each Other."

(Continued)

*Primary Examiner*—John Follansbee
*Assistant Examiner*—Alan S Chou
(74) *Attorney, Agent, or Firm*—Park, Vaughan & Fleming LLP (57) ABSTRACT

Methods and systems for enabling arbitrary components to control communications, such as data transfers, without having or requiring prior knowledge of each other. The system includes a component that creates controller objects for a communication, such as a data transfer involving several components. Further, the component associates the controller objects with a communication session object of the data transfer, such as a data transfer session object. One or more of the components involved in the data transfer obtain the controller objects through the data transfer session object and execute source-specific instructions included in the obtained controller objects to generate user interfaces. The user interfaces enable the components to control aspects of the communication, such as the data transfer.

39 Claims, 7 Drawing Sheets

OTHER PUBLICATIONS

Bluetooth Consortium 2001, *Specification of the Bluetooth System*, Version 1.1 core, Table of Contents and Index (2001) [Retrieved from the Internet at http://www.bluetooth.com on Sep. 27, 2001].

Bluetooth Consortium 2001, *Specification of the Bluetooth System*, Version 1.1 core, Part C, pp. 184-252 (2001) [Retrieved from the Internet at http://www.bluetooth.com on Sep. 27, 2001].

Bluetooth Consortium 2001, *Specification of the Bluetooth System*, Version 1.1 core, Part D, pp. 255-330 (2001) [Retrieved from the Internet at http://www.bluetooth.com on Sep. 27, 2001].

Bluetooth Consortium 2001, *Specification of the Bluetooth System*, Version 1.1 core, Part E, pp. 332-392 (2001) [Retrieved from the Internet at http://www.bluetooth.com on Sep. 27, 2001].

Bluetooth Consortium 2001, *Specification of the Bluetooth System*, Version 1.1 core, Part F:1, pp. 394-424 (2001) [Retrieved from the Internet at http://www.bluetooth.com on Sep. 27, 2001].

Bluetooth Consortium 2001, *Specification of the Bluetooth System*, Version 1.1 core, Part F:4, pp. 512-534 (2001) [Retrieved from the Internet at http://www.bluetooth.com on Sep. 27, 2001].

Bluetooth Consortium 2001, *Specification of the Bluetooth System*, Version 1.1 core, Part H:2, pp. 782-796 (2001) [Retrieved from the Internet at http://www.bluetooth.com on Sep. 27, 2001].

Bluetooth Consortium 2001, *Specification of the Bluetooth System*, Version 1.1 core, Appendix III, pp. 914-922 (2001) [Retrieved from the Internet at http://www.bluetooth.com on Sep. 27, 2001].

N. Borenstein et al., "MIME (Multipurpose Internet Mail Extensions): Mechanisms for Specifying and Describing the Format of Internet Messages," pp. 1-77 (1992) [Retrieved from the Internet at http://www.oac.uci.edu/indiv/ehood/MIME/1521/rfc152ITOC.html on Sep. 14, 2001].

E. Christensen et al., *Web Services Description Language (WSDL)* 1.1, (Jan. 23, 2001) [Retrieved from the Internet at http://msdn.microsoft.com/xml/general/wsdl.asp on Sep. 27, 2001].

N. Cutland, *Computability*, Cambridge University Press, pp. 7-42 (1980).

A. Dey et al., "A Conceptual Framework and a Toolkit for Supporting the Rapid Prototyping of Context-Aware Applications," *Human Computer Interaction Journal*, 16:1-67 (2001).

P. Dourish et al., "Extending Document Management Systems with User-Specific Active Properties," *ACM Transactions on Information Systems*, Xerox Palo Alto Research Center, pp. 1-27 (2000).

N. Economides, "The Economics of Networks," *International Journal of Industrial Organization*, 14:2, pp. 1-36 (1996).

W. K. Edwards, "Session Management for Collaborative Applications," *Proceedings of ACM Conference on Computer-Supported Cooperative Work CSCW '94)*, Georgia Institute of Technology, Chapel Hill, NC, (1994).

A. Fox et al., "Integrating Information Appliances into an Interactive Space," *IEEE Computer Graphics and Applications*, Stanford University, 20:3, pp. 54-65 (2000).

E. Gamma et al., *Design Patterns: Elements of Reusable Object-Oriented Software*, Addison-Wesley, pp. 1-31 (1995).

Y. Goland et al., *Simple Service Discovery Protocol/1.0: Operating Without an Arbiter*, Internet Engineering Task Force Internet Draft (1999) [Retrieved from the Internet at http://www.upnp.org/draft_cai_sssdp_v1_03.txt on Sep. 14, 2001].

C. Gray et al., "Leases: An Efficient Fault-Tolerant Mechanism for Distributed File Cache Consistency," *Proceedings of the 12th ACM Symposium on Operating Systems Principles (SOSP)*, Association of Computing Machines, pp. 202-210 (1989).

*User Interface Markup Language 2.0 Draft Specification*, Harmonia, Inc., pp. 1-64, (2000) [Retrieved from the Internet at http://www.uiml.org/specs/uiml2/index.htm on Sep. 14, 2001].

T. Hodes et al., "A Document-Based Framework for Internet Application Control," *Proceedings of the Second USENIX Symposium on Internet Technologies and Systems (USITS)*, USENIX Association, Boulder, CO, pp. 59-70 (1999).

D. Iseminger, *COM+ Developer's Reference*, Microsoft Press, pp. 1-6 (2000).

E. Kiciman et al., "Using Dynamic Mediation to Integrate COTS Entities in a Ubiquitous Computing Environment," *Proceedings of the Second International Symposium on Handheld and Ubiquitous Computing (HUC)*, Stanford University (2000).

G. Kiczales et al., *The Art of the Metaobject Protocol*, MIT Press, pp. 12-46 (1991).

T. Kindberg et al., "A Web-Based Nomadic Computing System," *HP Labs Technical Report HPL-2000-110*, pp. 1-13 (2000) [Retrieved from the Internet at http://cooltown.hp.com/papers/nomadic/nomadic.htm on Sep. 14, 2001].

[Author Unknown] "Plug and Play Specifications," Microsoft Corp., (1999) [Retrieved from the Internet at http://www.microsoft.com/HWDEV/respec/papspecs.htm on Sep. 14, 2001].

[Author Unknown] "Universal Plug and Play," Microsoft Corp. (2000) [Retrieved from the Internet at http://msdn.microsoft.com/library/psdk/upnp/upnpport_6zz9 on Sep. 27, 2001].

[Author Unknown] "C# Language Specification," Microsoft Corp., Microsoft Press, pp. 1-41 (2001).

W. Newman et al., "Cam-Works: A Video-based Tool for Efficient Capture from Paper Source Documents," *Proceedings of the International Conference on Multimedia Computing and Systems*, Florence, Italy, vol. 2, pp. 647-653 (1999).

J. Ockerbloom, *Mediating Among Diverse Data Formats*, Ph.D. thesis, Carnegie Mellon University, pp. 1-150 (1999).

[Author Unknown] "White Paper: Salutation Architecture Overview," Salutation Consortium (1998) [Retrieved from the Internet at http://www.salutation.org/whitepaper/originalwp.pdf on Sep. 27, 2001].

E. Saund, "Bringing the Marks on a Whiteboard to Electronic Life," *Cooperative Buildings: Integrating Information, Organizations, and Architecture, Second International Workshop*, Xerox Palo Alto Research Center (1999).

[Author Unknown] "JavaBeans Specification," Sun Microsystems, pp. 1-114 (1997) [Retrieved from the Internet at http://ja-va.sun.com/products/javabeans/docs/beans.101.pdf on Sep. 14, 2001].

[Author Unknown] "Jini Discovery and Join Specification," Sun Microsystems, pp. 1-32 (1999).

[Author Unknown] "UDDI Technical Whitepaper," Universal Description, Discovery, and Integration Consortium, pp. 1-12 (2000) [Retrieved from the Internet at http://www.uddi.org/pubs/lru_UDDI_Technical_White_Paper.PDF on Sep. 14, 2001].

B. Venners, *Jini Service UI Draft Specification* (2000) pp. 1-25 [Retrieved from the Internet at http://www.artima.com/jini/serviceui/ DraftSpec.html on Sep. 27, 2001].

J. Waldo, "The Jini Architecture for Network-centric Computing," *Communications of the ACM*, 42:7, pp. 76-82 (1999).

M. Weiser et al., "Designing Calm Technology" (1995) pp. 1-5 [Retrieved from the Internet at http://www.fxpal.com/ConferencesWorkshops/chi97/white-papers/Mark%2520Wesier.html on Oct. 10, 2001].

A. Woolrath et al., "A Distributed Object Model for the Java System," *USENIX Computing Systems*, vol. 9 (1996).

*Jini™ Architectural Overview Technical White Paper*, Sun Microsystems, Inc., Palo Alto, California, pp. 1-23 (1999).

*Jini™ Technology Glossary*, Sun Microsystems, Inc., Palo Alto, California, pp. 479-499 (2000).

*Jini™ Device Architecture Specification*, Sun Microsystems, Inc., Palo Alto, California, pp. 1-14 (2000).

*JavaSpaces™ Service Specification*, Sun Microsystems, Inc., Palo Alto, California, pp. 1-24 (2000).

*Jini™ Technology Core Platform Specification*, Sun Microsystems, Inc., Palo Alto, California, pp. 1-126 (2000).

*A Collection of Jini™ Technology Helper Utilities and Services Specifications*, Sun Microsystems, Inc., Palo Alto, California, pp. 1-124 (2000).

*Universal Description, Discovery and Integration Data Structure Reference V1.0*, Ariba, Inc. and International Business Machines Corporation and Microsoft Corporation, pp. 1-31 (2000).

*Universal Description, Discovery and Integration Programmer's API 1.0*, Ariba, Inc., International Business Machines Corporation and Microsoft Corporation, pp. 1-67 (2000).

*Universal Description, Discovery and Integration Technical White Paper*, Ariba, Inc., International Business Machines Corporation and Microsoft Corporation, pp. 1-12 (2000).

*Mapping Salutation Architecture APIs to Bluetooth Service Discovery Layer*, Version 1, IBM Corp., pp. 1-26 (1999).

*Bluetooth Protocol Architecture*, Version 1, Nokia Mobile Phones, pp. 1-20 (1999).

W. Edwards et al., "At Home with Ubiquitous Computing: Seven Challenges," G.D. Abowd, B. Brumitt, S.A.N. Shafer (Eds.); *Ubicomp 2001, LNCSA 2201*, pp. 256-272, (2001).

* cited by examiner

SYSTEM AND METHOD FOR CONTROLLING COMMUNICATION

FIELD OF THE INVENTION

This invention relates generally to communication systems and methods and, more particularly, to a system and method for enabling arbitrary components to control one or more aspects of communications, such as data transfers among components, employing control objects that include mobile code.

BACKGROUND OF THE INVENTION

In data communication environments, many different vendors provide a number of products for specific services. A machine, an application operating on a machine or a file system residing on a machine ("component") developed by one vendor might have difficulty communicating with a component developed by another. Domain-specific protocols have been developed to partially deal with this difficulty by enabling components to communicate with each other using a common language. But since new components are constantly being introduced into and taken out of an environment it has been difficult to develop a system or protocol that is not domain-specific yet is sufficiently robust to enable unknown, arbitrary components to enter the environment and communicate with each other without having to be programmed explicitly in advance.

For instance, if a new type of printer is connected to a computer, the computer would need to be programmed explicitly to be able to communicate with the new printer by installing a driver specific to that printer. In a system, such as Jini™, developed by Sun Microsystems of Palo Alto, Calif., and described in "A collection of Jini™ Technology Helper Utilities and Services Specifications," Palo Alto, Calif., Sun Microsystems, Inc., pp. 1-214, 2000; and "Jini™ Technology Core Platform Specification," Palo Alto, Calif., Sun Microsystems, Inc., pp. 1-126, 2000, all of which are hereby incorporated by reference in their entirety, which uses domain-specific interfaces, in order for a personal digital assistant ("PDA") to communicate with a printer, for example, the PDA must contain a priori knowledge of the semantics of the printer's programmatic interfaces. Moreover, a component that knows how to print, such as a printer, still may not know how to access a file system operating on the PDA device, for example, until it is programmed explicitly to communicate with the file system programmatic interfaces of the PDA.

Other difficulties may arise once communication is established among components using domain-specific protocols. Some components, such as computers, typically employ various mechanisms for providing feedback or allowing a user to control some aspect of the component's behavior during data transfers and other operations. Examples include a computer displaying a printer control panel for changing printer settings, a dialog box for selecting a particular file to print, or displaying a progress bar window when copying a file from a network file server to the computer. Unfortunately, these mechanisms are either inherent to the computer itself or are part of a pre-installed application that supports the user's task. In either case, the specific instructions for these mechanisms must be known in advance by the component, such as the computer, in the same manner described above with respect to the domain-specific protocols, which limits the ability for applications to interact in an ad hoc manner with components they are not explicitly programmed to use.

SUMMARY OF THE INVENTION

A system in accordance with embodiments of the present invention includes a first component in a plurality of components. The first component has at least one controller object, where each at least one controller object is associated with at least one of the plurality of components. Moreover, each at least one controller object is associated with at least one instruction which when executed by the first component enables the first component to control communication between at least two of the plurality of components.

A method and a program storage device readable by a machine and tangibly embodying a program of instructions executable by the machine in accordance with embodiments of the present invention includes obtaining at a first component at least one controller object from at least one of at least two components involved in a communication, executing at the first component at least one instruction associated with at least one obtained controller object, and controlling at the first component the communication between the at least two components based on the executed instruction.

A system in accordance with embodiments of the present invention includes a first component that has at least one controller object accessible to at least one other component. The at least one controller object is associated with at least one instruction, which when executed by the at least one other component, enables the at least one other component to control a communication involving the at least one other component.

A method and a program storage device readable by a machine and tangibly embodying a program of instructions executable by the machine in accordance with embodiments of the present invention includes creating at a first component at least one controller object for communication involving at least two components, sending the at least one controller object from the first component to at least one of the two components, accepting at the first component at least one command from the at least one of the two components which executes at least one instruction associated with at least one sent controller object, and controlling at the first component the communication between the at least two components based on the at least one command.

The present invention provides a mechanism by which components can control one or more aspects of communications, such as data transfers, without needing to have prior knowledge of any of the components involved in the transfer. Moreover, the present invention enables arbitrary components to dynamically provide user interfaces to other components as needed to enable the recipients to control communication without needing to have prior knowledge of the components creating or providing the interfaces.

DETAILED DESCRIPTION OF THE INVENTION

Figure 1:
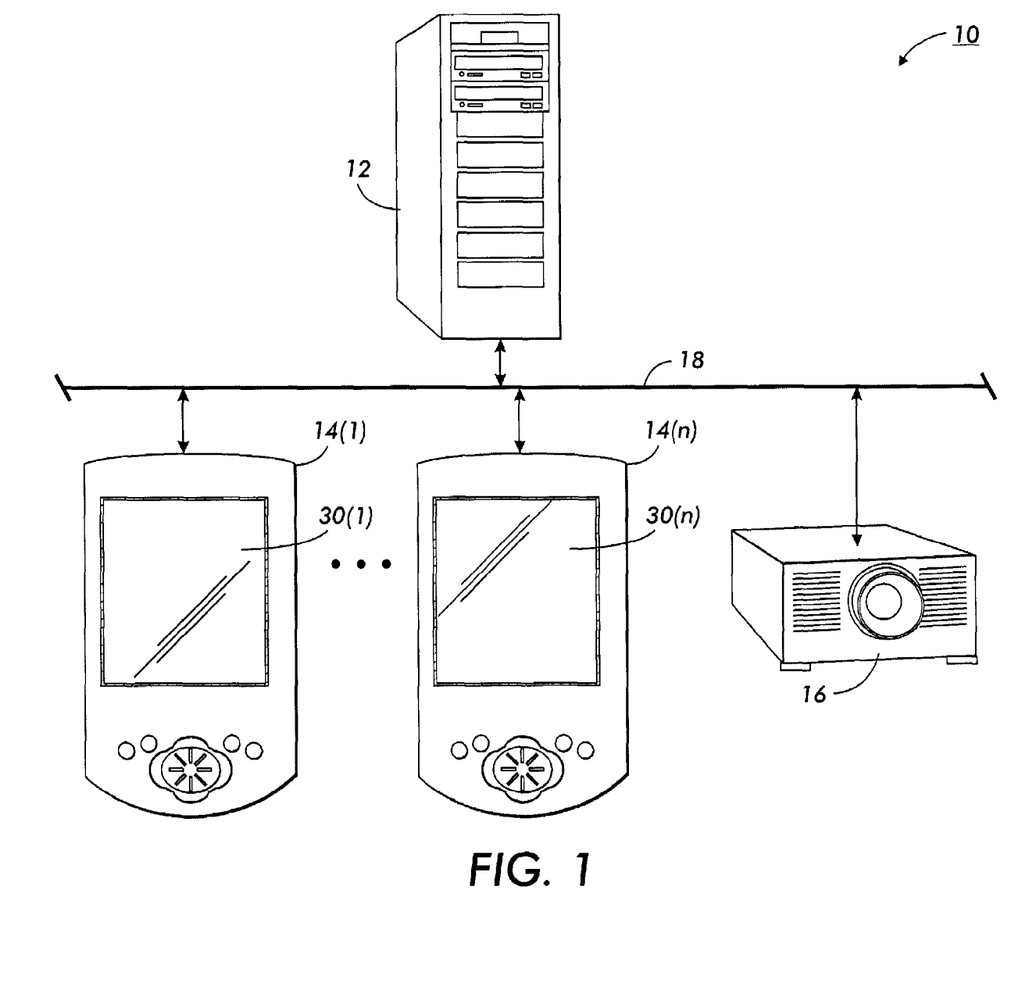
FIG. 1 is a diagram of a system for controlling communication in accordance with embodiments of the present invention.

A system 10 for enabling arbitrary components to control communication in accordance with embodiments of the present invention is shown in FIG. 1. In embodiments of the present invention, system 10 includes server 12, personal digital assistants ("PDAs") 14(1)-14(n) and projector 16 connected together by a network 18, although the system 10 may include different kinds and numbers of components. The present invention provides a system 10 by which arbitrary components, such as PDA 14(1), can control aspects of communications, such as data transfers, without needing to have prior knowledge of any of the other components involved in the data transfer, such as server 12 and projector 16. Moreover, the system 10 enables arbitrary components, such as server 12 and projector 16, to dynamically provide user interfaces to other components, such as one or more of the PDAs 14(1)-PDA 14(n), as needed to enable the recipients to control communication, such as data transfers, without needing to have prior knowledge of the components creating or providing the interfaces.

Server 12 comprises a general purpose computer and server system that performs a variety of functions such as data storage, file management and network routing, although other types and numbers of components can be used. Server 12 includes a processor, an I/O unit, volatile memory, non-volatile memory and mechanisms for reading data stored in the memory, which are coupled together by one or more buses, although other coupling techniques may be used, and used by server 12 to store and process instructions in accordance with embodiments of the present invention as described and illustrated further herein. The volatile memory is a random access memory, although other types of memories could be used, such as a dynamic random access memory or flash memory. The non-volatile memory is a fixed medium, such as a hard-disk, although other fixed mediums may be used, including tape, or portable data storage mediums, such as floppy-disks, compact-discs, digital-video discs, magnetic tapes or optical disks. The memory stores instructions and data for performing the present invention for execution by the processor, although some or all of these instructions and data may be stored elsewhere. Moreover, the I/O unit has one or more ports to connect server 12 to the network 18 using a line based medium such as coaxial cable, although the I/O unit may also include ports capable of receiving RF or infrared signals to enable the server 12 to communicate with the network 18. Since components, such as server 12, are well known in the art, the specific elements, their arrangement within server 12 and operation will not be described in further detail herein.

PDAs 14(1)-14(n) each comprise a hand-held computing device that performs a variety of functions such as information display, electronic messaging, telephony, facsimile transmissions or networking, although other types and numbers of components can be used. Each PDA 14(1)-14(n) includes a processor, an I/O unit, volatile memory, non-volatile memory and mechanisms for reading data stored in the memory, which may be coupled together by one or more buses, although other coupling techniques may be used, and used by the PDAs 14(1)-14(n) to store and process instructions in accordance with embodiments of the present invention as described and illustrated further herein. The same types of volatile and non-volatile memory used by the server 12 may be used by PDAs 14(1)-14(n) to the extent size constraints of PDAs 14(1)-14(n) permit. The memory stores instructions and data for performing the present invention for execution by the processor, although some or all of these instructions and data may be stored elsewhere. Moreover, the I/O unit has one or more ports to connect PDAs 14(1)-14(n) to the network 18 using a line based medium, such as coaxial cable, although the I/O unit may also include ports capable of receiving RF or infrared signals to enable the PDAs 14(1)-14(n) to communicate with the network 18. Since components, such as PDAs 14(1)-14(n), are well known in the art, the specific elements, their arrangement within PDAs 14(1)-14(n) and operation will not be described in further detail herein.

Projector 16 comprises a device that can project images representing text and/or graphics onto a fixed medium, such as a projection screen, although other types and numbers of components can be used. Projector 16 includes a processor, an I/O unit, volatile memory, non-volatile memory and mechanisms for reading data stored in the memory, although a hardware interface device including the above-described elements may be connected to projector 16. In either case, the elements may be coupled together by buses, although other coupling techniques may be used, and used by the projector 16 to receive and process data representing images to be projected, and to store and process instructions in accordance with embodiments of the present invention as described and illustrated further herein. The same types of volatile and non-volatile memory used by server 12 may be used by projector 16 to the extent size constraints of projector 16 permit. The memory stores instructions and data for performing the present invention for execution by the processors, although some or all of these instructions and data may be stored elsewhere. Additionally, the I/O unit has one or more ports to connect projector 16 to the network 18 using a line based medium, such as coaxial cable, although the I/O unit may also include ports capable of receiving RF or infrared signals to enable the projector 16 to communicate with the network 18. Moreover, the projector 16 includes audio output devices, such as speakers. Since components such as projector 16 are well known in the art, the specific elements, their arrangement within projector 16 and operation will not be described in further detail herein.

Components, such as server 12, PDAs 14(1)-14(n) and projector 16, are provided for exemplary purposes only. In embodiments of the present invention, the components may comprise any type of device or system that can store, process and execute instructions for performing one or more methods of the present invention as will be described in further detail herein, although the components may also comprise executable programs or other types of software entities that may be executed by or reside in a memory of a device or system. By way of example only, the components shown in FIG. 1 may also comprise scanners, lap-top computers, cellular telephones, display devices, video input/output devices, audio input/output devices, copier devices, printer devices, remote control devices, appliances and file systems or databases residing in a computer system.

Network 18 comprises a public network, such as the Internet, which includes one or more local area networks ("LANs"), such as Ethernet™ networks, wide area networks ("WANs"), telephone line networks and wireless networks, such as a Bluetooth™ network, although other types of public or private networks may be used, such as a proprietary organizational network spread out over several geographical locations. Moreover, network 18 enables server 12, PDAs 14(1)-14(n) and projector 16 to communicate with each other and any other components with access to the network 18.

The operation of the system 10 for enabling arbitrary components to control communication in accordance with embodiments of the present invention will now be described with reference to FIGS. 1-8. In embodiments of the present invention, the term "component" is intended to refer to one or more applications or programs executing on the server 12, PDAs 14(1)-14(n), and projector 16, such as a slide show program, although components may refer to the actual hardware devices executing those applications. For ease of discussion and illustration, reference will be made generally to the server 12, PDAs 14(1)-14(n), and projector 16 throughout the embodiments of the present invention, rather than to the specific applications executing on those machines.

By way of example only, a user of the PDA 14(1) may desire presenting slides stored in files for a slide show presentation. But, the PDA 14(1) may not have sufficient processing and memory capacities to store and operate an entire slide show program, such as MS PowerPoint™. Further, the display 30 of the PDA 14(1) may hinder presenting the show to a group of users because of a limited display area. Thus, the PDA 14(1) user may desire accessing and controlling a slide show program component or other component programs stored elsewhere, such as the server 12, to display the stored slides using a suitable device, such as the projector 16. Moreover, a user of PDA 14(n) may desire to monitor the data transfer, such as for viewing the slides as they are presented.

Figure 2:
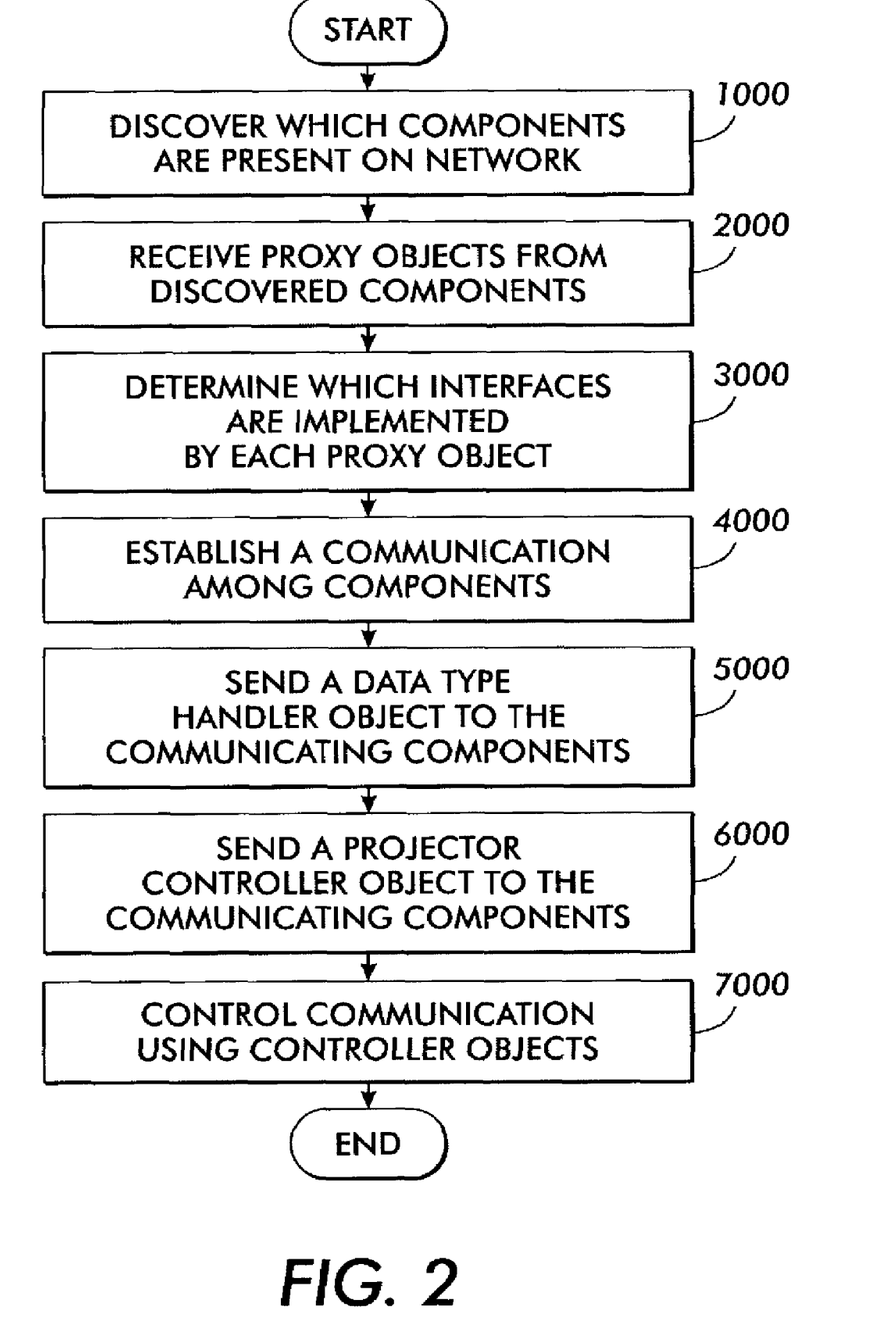
FIG. 2 is a flow chart of a process for controlling communication in accordance with embodiments of the present invention.

Referring to FIGS. 1-2 and beginning at step 1000, PDA 14(1) performs a discovery process to determine which components are present on the network 18 and what their communication capabilities are. In embodiments of the present invention, PDA 14(1) at least discovers server 12, PDA 14(n) and projector 16 using a Jini™ system discovery protocol, although a variety of other discovery protocols may be used, such as Bluetooth™ SLP, UDDI, or simple lookup in a name server, for example, as disclosed in U.S. patent application Ser. No. 09/838,933 to Edwards et al., titled "SYSTEM AND METHOD FOR ENABLING COMMUNICATION AMONG ARBITRARY COMPONENTS," filed Apr. 20, 2001 which is hereby incorporated by reference in its entirety.

The PDA 14(1) may be programmed to automatically perform the discovery process upon the user expressing a desire to establish a particular type of communication, such as a data transfer, for transferring stored slides from server 12 to projector 16 for display thereon, although the PDA 14(1) may be programmed to allow the user to manually initiate the discovery process. For instance, the PDA 14(1) may display the discovered components (not illustrated) on its display 30, and the user may select the components desired to be involved in the data transfer, such as PDAs 14(1), 14(n), server 12 or projector 16, as disclosed in U.S. patent application Ser. No. 10/212,377 to Edwards et al., titled "SYSTEM AND METHOD FOR ENABLING COMPONENTS ON ARBITRARY NETWORKS TO COMMUNICATE," filed concurrently herewith, which is hereby incorporated by reference in its entirety. Alternatively, the PDA 14(1) may be programmed to automatically select the components based upon a number of criteria, such as component availability and suitability for the type of data desired to be transferred, such as MS PowerPoint™ slides, MS PowerPoint™ executable content, MS Word™ files, etc., or the physical location of the components in network 18.

At step 2000, server 12 returns a server proxy object to PDA 14(1), PDA 14(n) returns a PDA proxy object to PDA 14(1), and projector 16 returns a projector proxy object to PDA 14(1), all of which are stored in a memory of PDA 14(1), although the objects may be stored elsewhere that is accessible to the PDA 14(1). Each proxy object includes one or more universal interfaces associated with the particular component each proxy object is received from, in this particular example server 12, PDA 14(n) and projector 16, thereby making the interfaces and their respective operations, instructions and data accessible to the receiving component, such as PDA 14(1).

In embodiments of the present invention, server 12 has stored in its memory and implements, or otherwise has access to ("associated with"), a data source interface, although the server 12 may also implement a variety of other interfaces, such as a contextual interface, a notification interface and a user interface, as disclosed in U.S. patent application Ser. No. 09/838,933 to Edwards et al., titled "SYSTEM AND METHOD FOR ENABLING COMMUNICATION AMONG ARBITRARY COMPONENTS," filed Apr. 20, 2001, which has already been incorporated by reference in its entirety. Alternatively, the above-mentioned interfaces may be implemented in the server proxy object. In embodiments of the present invention, the PDAs 14(1), 14(n) and the projector 16 are each associated with a data sink interface, although the PDAs 14(n), 14(1) and projector 16 may also be associated with a variety of other interfaces, in the same manner described above with respect to the server 12.

In embodiments of the present invention, the server 12, PDAs 14(1)-14(n) and projector 16 proxy objects and their associated interfaces, operations and instructions, as well as any other interfaces, operations and instructions that may be subsequently described herein, comprise mobile code, such as JAVA, although other languages may be used, such as Smalltalk, CLOS, Ada or Object Pascal. Mobile code is executable data that can be transmitted to server 12, one or more PDAs 14(1)-14(n) or projector 16 where it is executed as described herein. In embodiments of the present invention, the mobile code is object-oriented, which is a programming methodology that is well known in the computer programming arts where data types may be defined along with associated procedures or sets of instructions, the data types in this context often referred to as classes, although the mobile code may be procedure-oriented, logic-oriented, rule-oriented or constraint-oriented.

At step 3000, PDA 14(1) inspects each received proxy object, such as the server 12, PDA 14(n) and projector 16 proxy objects, to determine which universal interfaces server 12, PDA 14(n) and projector 16 implement. PDA 14(1) determines that the server proxy object implements at least a data source interface and that the PDA 14(n) and projector 16 proxy object at least implements a data sink interface. In this example, PDA 14(1) invokes the data source interface associated with server 12 and the data sink interfaces associated with the PDA 14(n) and projector 16, respectively, and the instructions, operations and data included in the interfaces are available to PDA 14(1).

At step 4000 and referring to FIGS. 3-8, the PDA 14(1) establishes a communication session among server 12, PDAs 14(1), 14(n) and projector 16. The communication session in embodiments of the present invention is a data transfer between components 12, 14(1), 14(n), and 16, although the session may involve other types of communications, such as transferring contextual data, or providing event notifications as disclosed in U.S. patent application Ser. No. 09/838,933 to Edwards et al., titled "SYSTEM AND METHOD FOR ENABLING COMMUNICATION AMONG ARBITRARY COMPONENTS," filed Apr. 20, 2001, which has already been incorporated by reference in its entirety.

Figure 3:
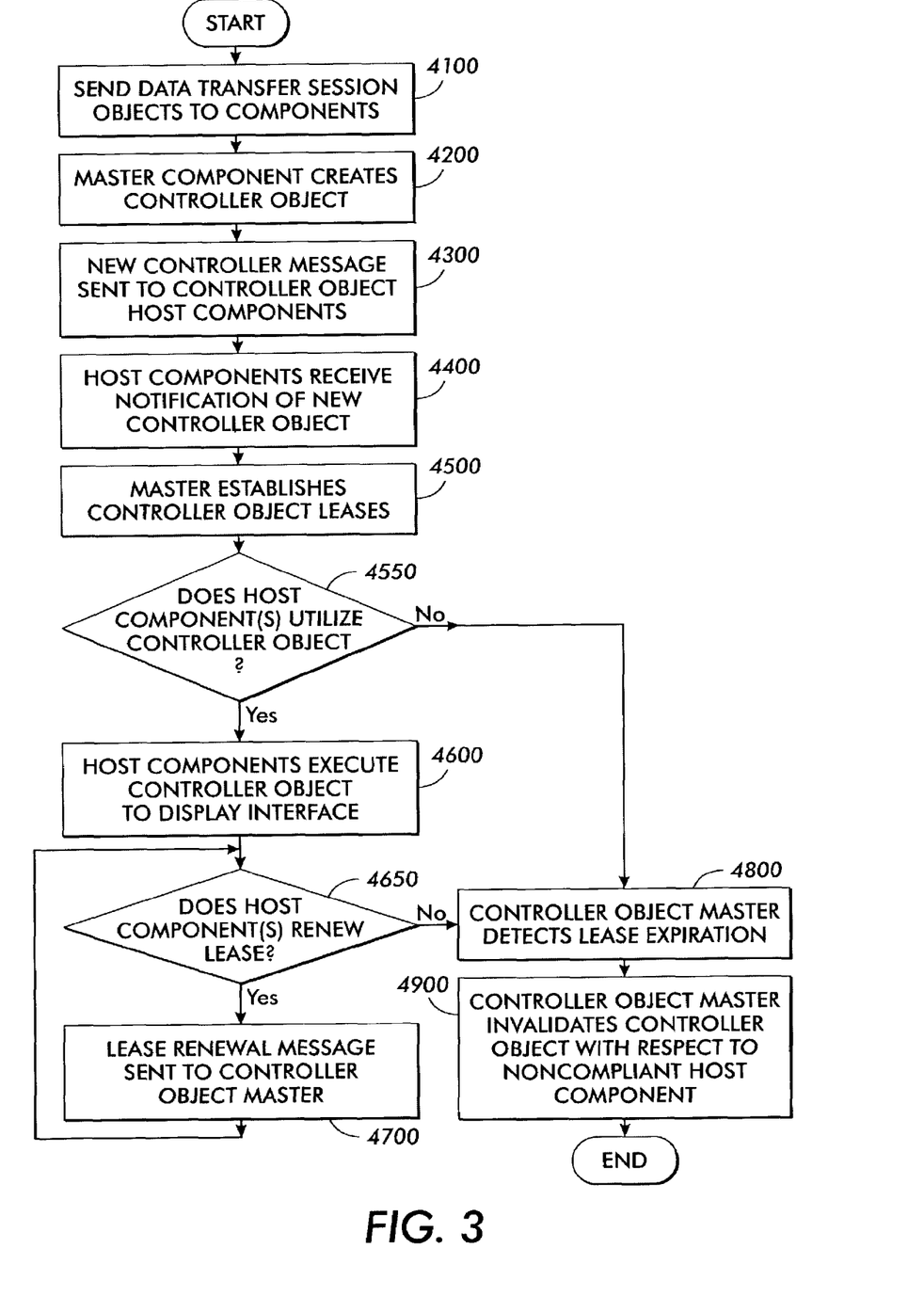
FIG. 3 is a flow chart of a process for establishing a communication in accordance with embodiments of the present invention.

Referring to FIG. 3 and at step 4100, PDA 14(1) executes a beginTransferSession( ) operation included in the data source interface associated with server 12. The beginTransferSession( ) operation includes operations, instructions and data that may be executed by PDA 14(1) to request the server 12 to communicate with the PDA 14(1). Accordingly, the server 12 sends a copy of the data transfer session object 20(1) to the PDA 14(1) using a TCP/IP communication protocol, which is shown as data transfer session object 20(2) in FIG. 5, although other protocols can be used, such as RPC, CORBA, SOAP and RMI. The data transfer session object 20(2) includes instructions, operations and data that are specific to the server 12, but may be understood and executed by components having access to a copy of the object 20(1), such as the PDAs 14(1), 14(n) and the projector 16. The PDA 14(1) may execute a getTransferData( ) operation included in the session object 20(2), as well as any other instructions needed to enable PDA 14(1) to actually retrieve data from server 12, such as executable content for accessing an MS Power-Point™ slide show program.

PDA 14(1) executes a Transfer( ) operation included in the data sink interfaces associated with the PDA 14(n) and projector 16. The Transfer( ) operation includes operations, instructions and data that may be understood and executed by PDA 14(1) to request PDA 14(n) and projector 16 to participate in a data transfer with the server 12 and the PDA 14(1). Accordingly, PDA 14(1) passes a copy of the data transfer session object 20(2) into the Transfer( ) operation calls to make the object 20(2) accessible to the PDA 14(n) and the projector 16, which are shown as data transfer session objects 20(n), 20(3) in FIGS. 6 and 7, respectively, to cause the projector 16 to begin communicating with the server 12, and to enable the PDA 14(n) to at least monitor the communication.

The PDA 14(n) and the projector 16 may retrieve and receive data from the server 12 through the objects 20(n), 20(3), respectively. The PDA 14(1) may be programmed to also invoke a data sink interface associated with the server 12 so it may execute a Transfer( ) operation to pass its own data transfer session object (not illustrated) to server 12 for transmitting data to the server 12 if necessary during operation of the slide show program. Likewise, the PDA 14(n) and the projector 16 may be programmed to also invoke a data sink interface associated with the server 12 or the PDA 14(1) and execute a Transfer( ) operation to pass their own data transfer session object (not illustrated) to server 12 for transmitting data to the server 12 if necessary during operation of the slide show program.

At step 4200, the server 12 creates a server controller object 22(1), and executes an addController( ) operation on the data transfer session object 20(1). This causes a copy of server controller object 22(1) to be sent to each of the other components holding copies of the session object 20(1). The server controller object 22(1) includes mobile code instructions that may be received and executed by components, such as PDAs 14(1), 14(n) and projector 16, to generate custom user interfaces with respect to the component that creates the controller object 22(1), such as the server 12 in this particular example. Components, such as the PDA 14(1), may execute the instructions included in the controller object 22(1) to control one or more aspects of the data transfer. The instructions included in the server controller object 22(1) are specific to the server 12, yet may be understood and executed by the recipients of the object 22(1) copies, such as PDAs 14(1), 14(n) or projector 16. The server controller object 22(1) becomes accessible to the components 14(1), 14(n) and 16 through the data transfer session objects 20(2), 20(n), 20(3), respectively, and are shown as server controller objects 22(2), 22(n), 22(3) in FIGS. 4-6.

Moreover, the server controller objects 22(1), 22(2), 22(n), 22(3), and any controllers subsequently described herein, may be created at any point during performance of steps 4000-6000 or in parallel with steps 4000-6000. In embodiments of the present invention, server 12 "pushes" the controller objects 22(2), 22(n), 22(3) onto the components involved in the data transfer, such as PDAs 14(1), 14(n) and projector 16, respectively, although components may request the controller objects as needed. Additionally, server 12 may require that any component associated with the data transfer, such as PDAs 14(1), 14(n) or projector 16, at least have access and be able to use the server controller objects 22(2), 22(n), 22(3), respectively.

At step 4300, the server 12 sends an asynchronous event notification using a TCP/IP communications protocol to the components having access to a copy of the data transfer session object 20(1), such as PDAs 14(1), 14(n) and server 16, although other protocols can be used, such as RCP, CORBA, SOAP, and RMI. This notification indicates one or more of the components holding a copy of the session object 20(1), such as server 12, has created a new controller object, such as server controller object 22(1), and has associated it with the session object 20(1). The asynchronous event notification that is sent includes a copy of the controller object 22(1).

At step 4400, the components having a copy of the data transfer session object 20(1), such as the PDAs 14(1), 14(n), and 16, receive the notification sent from server 12 as described above in connection with step 4300, and extract from it a copy of the server controller object 22(1), shown as 22(2), 22(n) and 22(3). Additionally, the components 14(1), 14(n) and 16 may be programmed to "poll" or request from the data transfer session object a copy of the server controller object 22(1), rather than having the copy delivered to them in an asynchronous notification. Moreover, the components 14(1), 14(n) and 16 may poll or request controller objects upon particular events occurring, such as receiving a copy of the data transfer session object 20(1) or detecting that new components are participating in the data transfer. Alternatively, the asynchronous event notification sent from server 12 does not include a copy of server controller object 22(1), but includes an indication that server controller object 22(1) has been created and is now accessible. In this example, the components having a copy of the data transfer session object 20(1) would fetch copies of server controller object 22(1) from server 12 or from some other resource, such as a web server, upon being notified that the server controller object 22(1) is available.

At step 4500, the server 12 includes "lease renewing" instructions in the server controller object 22(1), and hence objects 22(2), 22(n), 22(3), which must be executed by the PDAs 14(1), 14(n) and projector 16 to retain access and use of the controller objects 22(2), 22(n), 22(3) during the data transfer, although including these lease renewing instructions are optional. The lease renewing instructions instruct the holders of the controller objects 22(2), 22(n), 22(3), such as PDAs 14(1), 14(n) and projector 16 in this particular example, to send an acknowledgment to the server 12, or any component that creates controller objects, at set time intervals, although the acknowledgments may be required upon other conditions occurring.

Server 12 may desire requiring the leasing of server controller objects 22(2), 22(n), 22(3) so that the server 12 may be released from the data transfer in the event one or more of the components 14(1), 14(n) and 16 are no longer part of the data transfer because the components have crashed, lost contact with network 18, or expressed a desire to no longer possess or have access to the server controller objects 22(2), 22(n), 22(3), respectively, or the data transfer has naturally terminated. Thus, upon server 12 not receiving the required acknowledgment from one or more components involved in the data transfer, projector 16 will recall one or more controller objects 26(2), 26(n), 26(3) to allow other components to control the projector 16.

At decision box 4550, if one or more of the components, such as the PDA 14(1), utilize their respective copy of the controller object 22(1), then the YES branch is followed, and step 4600 is performed as described below, otherwise the server 12 will eventually detect the failure of one or more components to send the acknowledgment, as described at step 4800.

Figure 5:
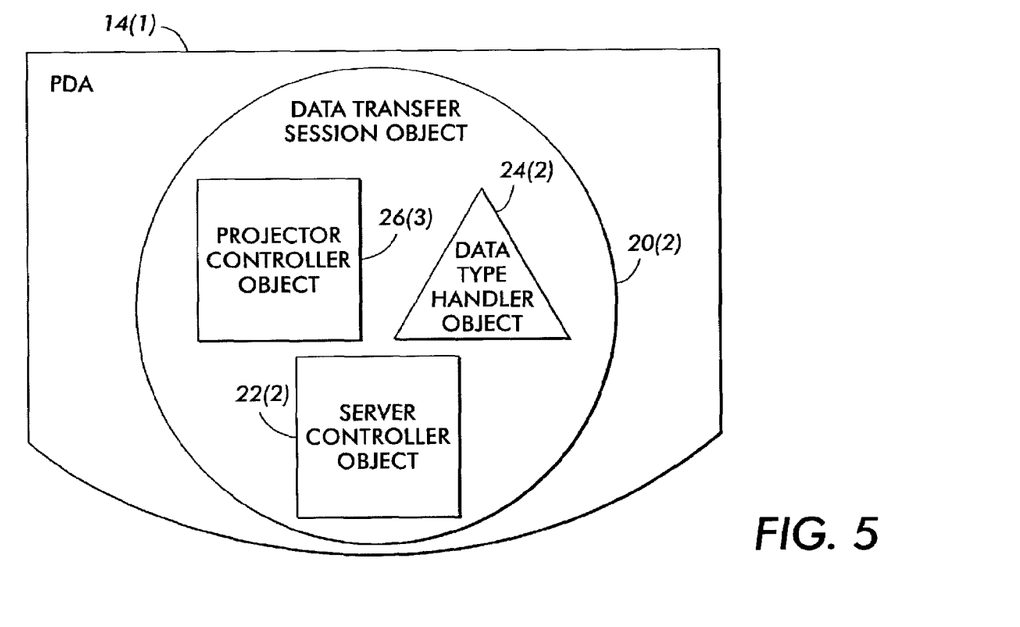
Figure 8:
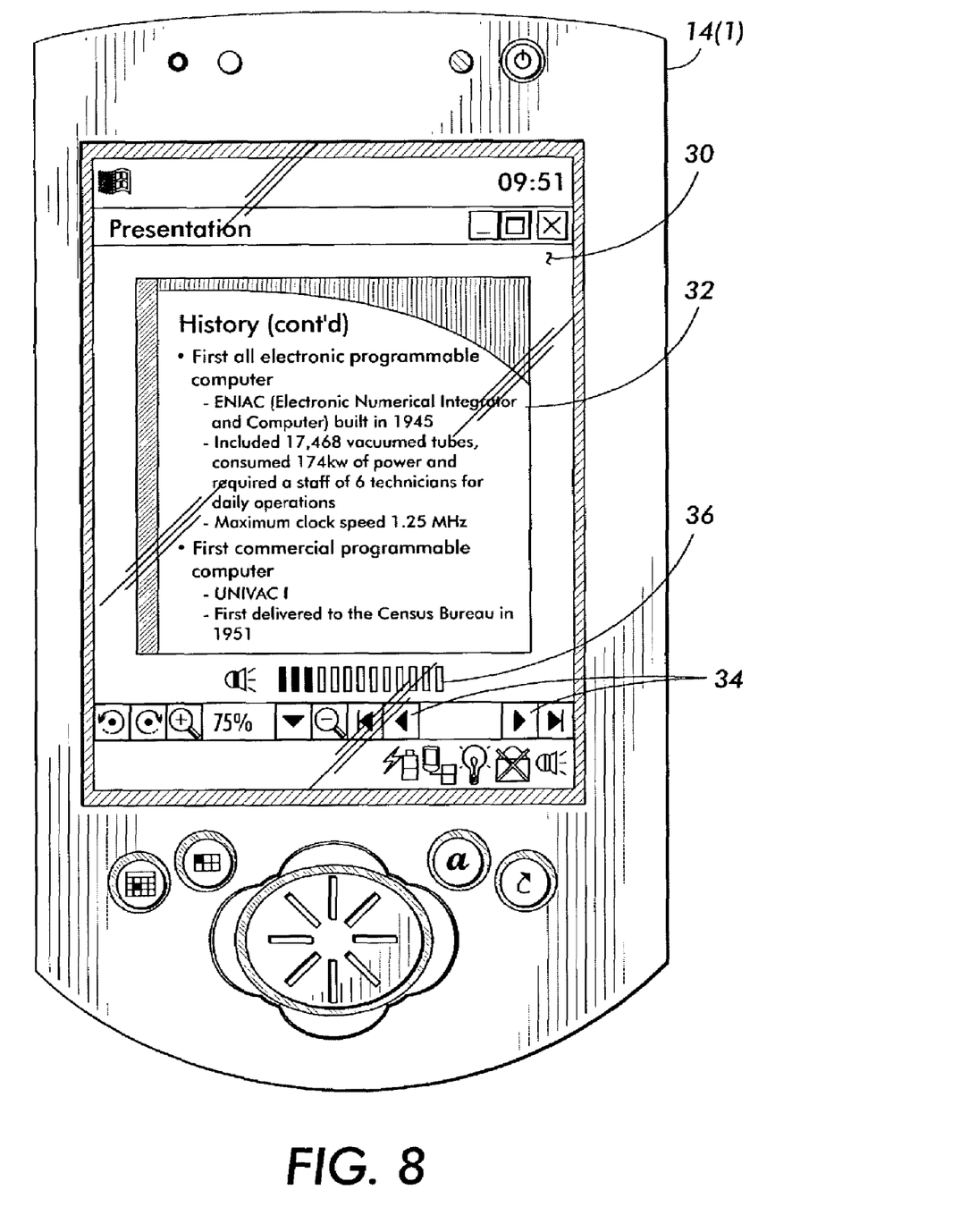
FIG. 8 is an exemplary user interface used to control communication in accordance with embodiments of the present invention.

At step 4600, and referring to FIGS. 5 and 8 and the example provided above at step 1000, the PDA 14(1) may execute instructions included in the server controller object 22(2) to generate and display a user interface, such as buttons 34 for advancing the slides, although the server controller object 22(2) may include instructions for generating audio prompts using an audio output device, such as a speaker, and to accept user input through an audio input device, such as a microphone, keyboard or keypad. Additionally, the PDA 14(1) may execute instructions included in the server controller object 22(2) that cause the PDA 14(1) to send a message to the creator of the controller object 22(2), such as the server 12 in this particular example, informing the server 12 that the PDA 14 has generated and displayed the server controller object 22(2), although the instructions may cause the PDA 14(1) to send a message to the components holding a copy of the data transfer session object 22(1). Such as message is sent using a TCP/IP communication protocol, although other protocols can be used, such as RPC, CORBA, SOAP and RMI.

A user may manipulate an input device associated with the PDA 14(1), such as a mouse or joystick, to move a displayed graphical cursor for selecting the appropriate buttons 34 to display a next or preceding slide. The selections made by the user using the buttons 34 are communicated back to the controller object 22(1) at the server 12 using a TCP/IP communication protocol, although other protocols can be used, such as RPC, CORBA, SOAP and RMI. The server 12 executes the instructions to effect the changes, such as displaying a next slide in the slide show. Alternatively, the PDA 14(1) may access the server 12 directly while executing the instructions included in the server controller object 22(1). Here, the instructions provided, such as the actual slide show commands, would enable the PDA 14(1) to directly access the slide show program to make the changes.

At decision box 4650, if one or more of the components, such as the PDA 14(1), desire retaining access to their copy of the controller object 22(1), the YES branch is followed. At step 4700, the one or more components, such as the PDA 14(1), which desire retaining their respective copy of the controller object 22(1), send the server 12 an acknowledgment message to renew the controller object lease. These acknowledgment messages are sent using a TCP/IP communication protocol, although other protocols can be used, such as RPC, CORBA, SOAP and RMI. The server 12 renews the server controller objects 22(2), 22(n), 22(3) lease for the compliant component(s), thereby enabling PDAs 14(1), 14(n) and projector 16 to retain access and use of the server controller objects 22(2), 22(n), 22(3) at least until another acknowledgment is expected by the server 12. Thus, steps 4650 and 4700 are performed until one or more of the components, such as the PDA 14(1), fail to send the lease renewing acknowledgment message to the server 12.

If at decision box 4650 one or more of the PDAs 14(1), 14(n) and projector 16 fail to renew the controller object lease, the NO branch is followed and step 4800 is performed. At step 4800, the server 12 determines that one or more of the components, such as the PDA 14(n) and the projector 16 in this particular example, have not sent an acknowledgment within the set time interval to renew the lease.

At step 4900, the server 12 invalidates the server controller object 22(1) with respect to the non-compliant component(s), such as the PDA 14(n), and the projector 16 in this particular example. Invalidating the server controller object 22(1) renders copies of the controller objects 22(2), 22(n) and 22(3) inoperable. Moreover, the server 12 may terminate the data transfer at this point. Also, the server 12 may update data included in the data transfer session objects 22(2), 22(n), 22(3) that describes the status of the objects 22(2), 22(n), 22(3) with respect to the non-compliant component(s), respectively. Since one or more of the controller objects 22(2), 22(n), 22(3) are invalidated, the server 12 assumes the non-compliant controller object host component is no longer available. The server 12 updates the data in the remaining objects 22(2), 22(n) or 22(3) at the compliant controller object host component(s) to indicate the component's unavailability, although the server 12 may send a message to the remaining components indicating the unavailability. Such a message could be sent using a TCP/IP communication protocol, although other protocols can be used, such as RPC, CORBA, SOAP and RMI.

Steps 4500-4900 are performed as described above until there are no server controller objects 22(2), 22(n), 22(3) associated with the data transfer, the data transfer has ended, server 12 has lost contact with the network 18, or server 12 is no longer part of the data transfer. Moreover, steps 4500-4900 may be performed at any point during the performance of steps 4000-6000 or in parallel with steps 4000-6000.

Referring back to FIG. 2 and continuing at step 5000, the server 12 creates a data type handler object 24(1), as disclosed in U.S. patent application Ser. No. 10/212,375 to Edwards et al., titled "A METHOD AND SYSTEM FOR HANDLING DATA," filed concurrently herewith, which is hereby incorporated by reference in its entirety. The data type handler objects 24(1), 24(2), 24(n), 24(3) each include instructions, operations and data that are native to the server 12, but may be read and executed by the PDAs 14(1), 14(n) and the projector 16, respectively, as needed to understand one or more data types that the server 12 supports during a data transfer, although the handler objects 24(1), 24(2), 24(n), 24(3) may each also comprise a reference, such as a pointer, to a location of the instructions, operations and data forming the handler object 24(1), such as an Internet address. In the example provided above at step 1000, the server 12 may include the appropriate instructions that the PDAs 14(1), 14(n) and the projector 16 may retrieve and execute through the handler objects 24(1), 24(2), 24(n), 24(3), respectively, for processing MS PowerPoint™ slides to be projected.

In embodiments of the present invention, the data type handler object 24(1) creates a data-type-handler-controller object (not illustrated) in the same manner described above in connection with steps 4200-4900. The data-type-handler-controller object includes instructions specific to the data type handler object 24(1). Moreover, the data type handler object 24(1) may require the data-type-handler-controller object to be leased in the same manner as the server 12 requires leasing as described above in connection with steps 4500-4900. Further, the data type handler object 24(1) may send PDAs 14(1), 14(n) and projector 16 a notification that the data-type-handler-controller object has been created, as described above at step 4400. Further, the data-type-handler-controller object includes instructions to generate a graphical user interface to allow the user to control parameters of a format conversion. For example, if the data type handler object 24(1) converts data from a GIF format to a JPEG format, the data-type-handler-controller object may provide control interfaces to manipulate the compression ratio or the quality of the resulting JPEG data.

Figure 4:
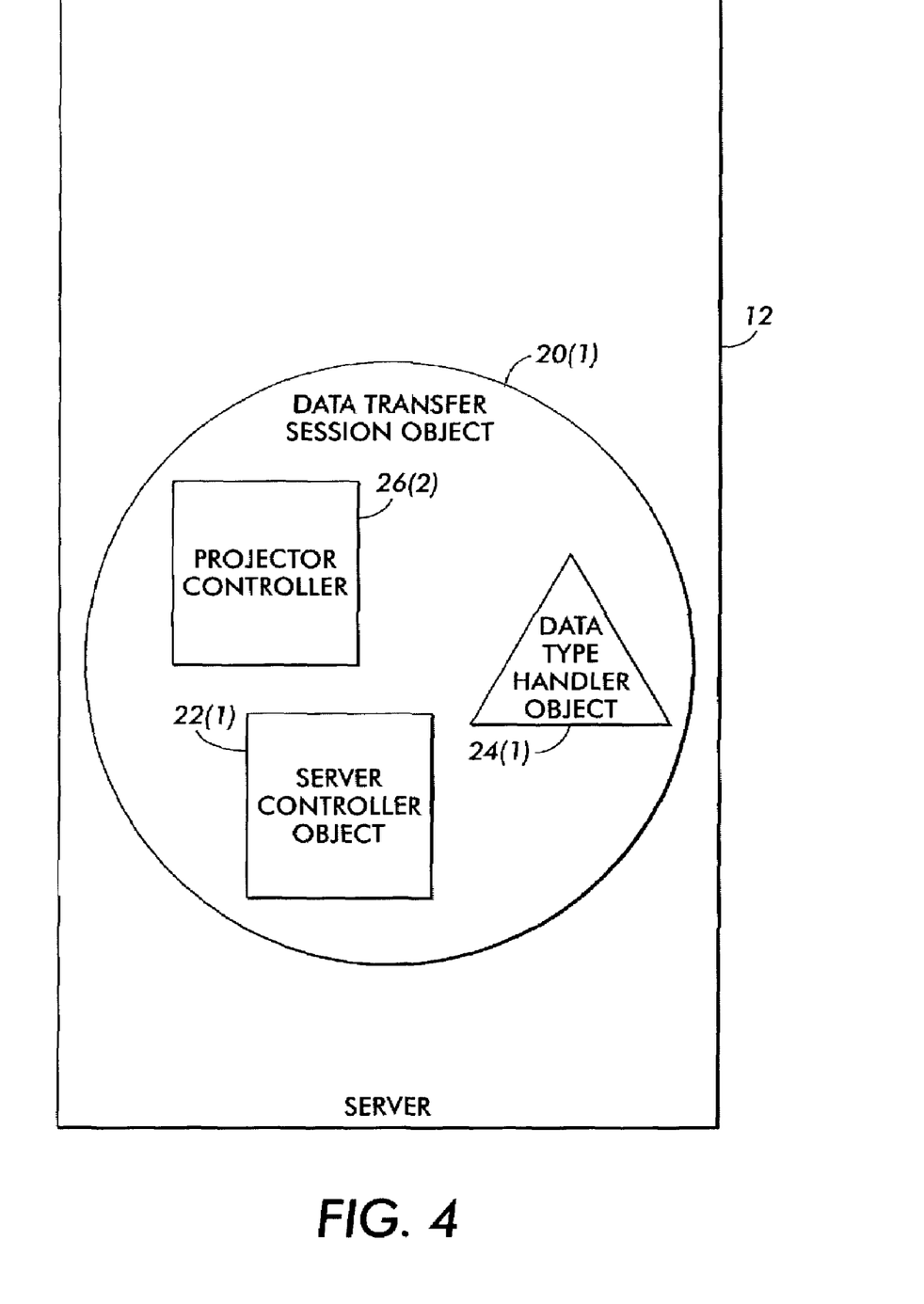
FIGS. 4-7 are functional block diagrams of a server, PDAs and projector used in a system for controlling communication in accordance with embodiments of the present invention.
Figure 6:
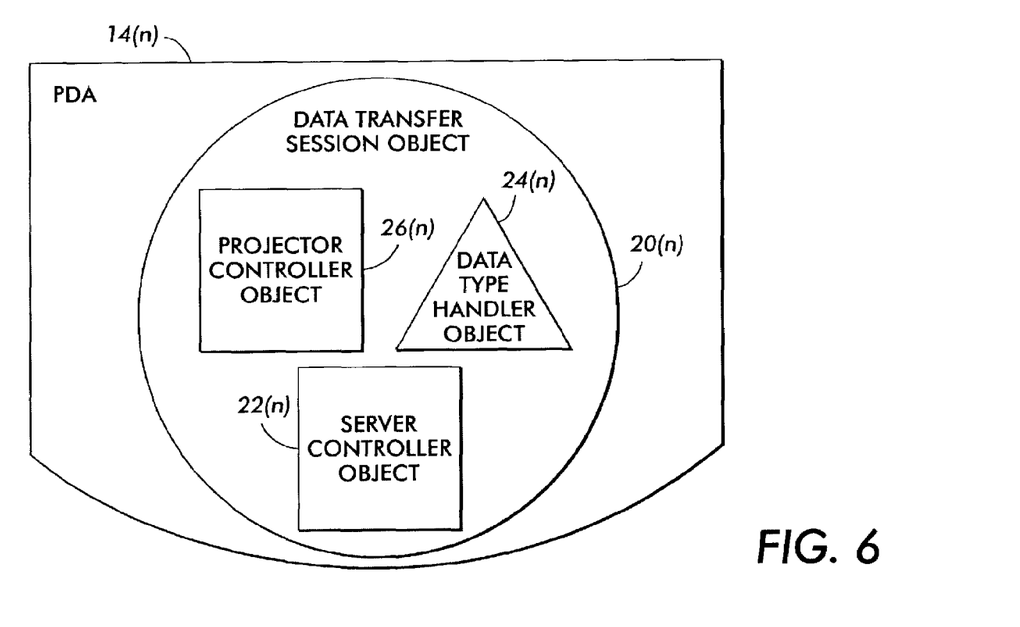
Figure 7:
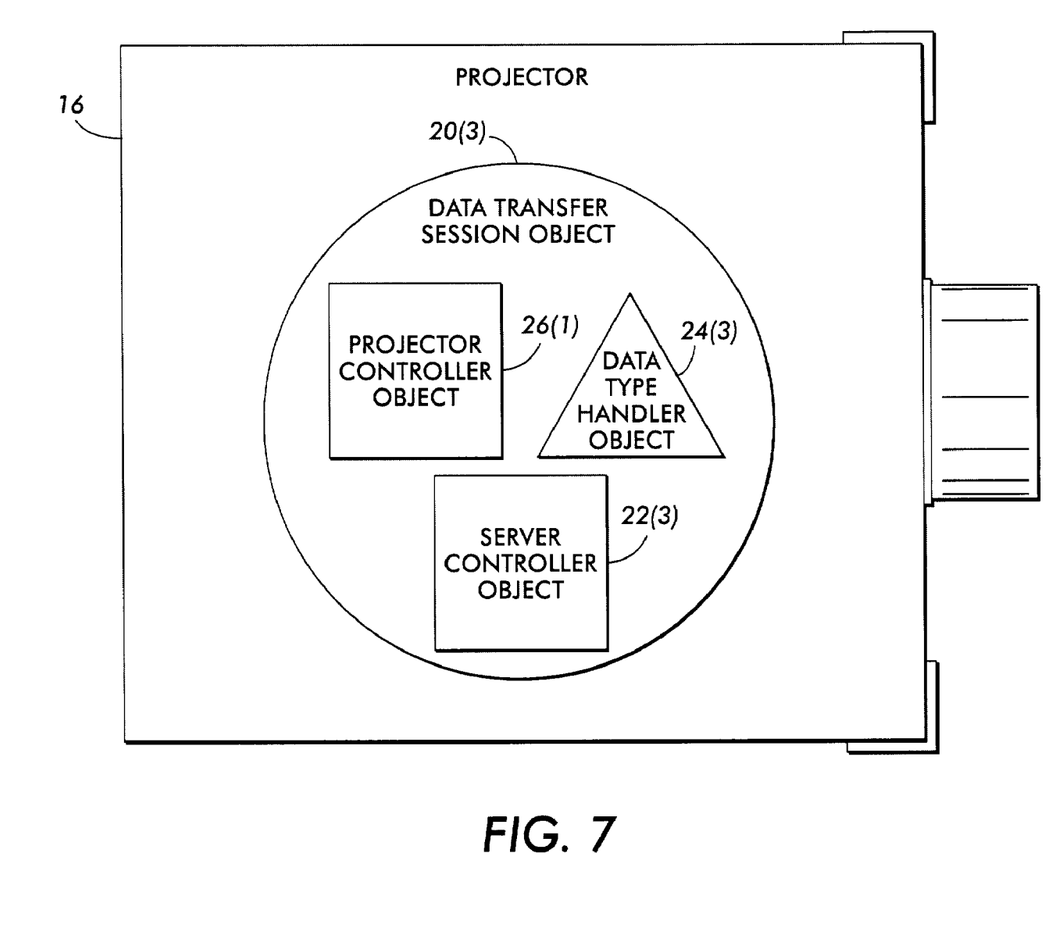

At step 6000 and referring to FIG. 7, projector 16 creates a projector controller object 26(1) in the same manner described above in connection with steps 4200-4900, except the projector 16 associates the projector controller object 26(1) with the data transfer session object 20(3), and hence session objects 20(1), 20(2), 20(n), which are shown as projector controller objects 26(2), 26(3), 26(n), respectively, in FIGS. 4-6. The projector controller objects 26(2), 26(3), 26(n) and 26(1) are the same as the server controller objects 22(1), 22(2), 22(n), 22(3), respectively, described above in connection with step 4200, except the projector controller objects 26(2), 26(3), 26(n) and 26(1) each include instructions specific to the projector 16 as described further herein. Moreover, the projector may require the controller objects 26(1), 26(2), 26(n), 26(3) to be leased in the same manner as the server 12 requires leasing as described above in connection with steps 4500-4900. Further, the projector 16 may send server 12 and PDAs 14(1), 14(n) a notification that the controller object 26(1) has been created as described above at step 4400.

In the example provided above at step 1000 and referring to FIGS. 5 and 9, the PDA 14(1) may execute instructions included in the projector controller object 26(3) to generate and display a graphical speaker volume control interface 36, although the PDA 14(n) may execute the instructions in the projector controller object 26(n), as shown in FIG. 6, to generate a controller interface as well. While a volume control 36 is shown, the projector controller object 26(3) may also include instructions for generating a control panel to adjust the brightness or contrast of the images projected by the projector 16. A PDA 14(1) user may manipulate an input device, such as a mouse, to move a displayed graphical cursor for selecting the successive bars of the volume control interface 36 to adjust the volume of an audio output device, such as a speaker, associated with the projector 16. The changes made by the user using the control interface 36 will be communicated back to the projector controller object 26(1), or directly to the projector 16 as described above at step 4600 with respect to the server controller object 22(1).

At step 7000, PDA 14(1) executes the getTransferData( ) operation included in the data transfer session object 20(2) to retrieve data from server 12. The PDA 14(1) may be programmed to automatically begin retrieving data from the server 12 as soon as the data transfer session object 20(2) is received by the PDA 14(1) as described above in step 4100, or upon receiving user input through an input device, such as a mouse or keypad, indicating a user's desire to begin data transfer. Referring back to the example provided above at step 1000, the PDA 14(1) receives from the server 12 data representing executable content that is executed by the PDA 14(1) to access a slide show, and display using display 30, the slides of the show, although the PDA 14(n) or any other components having a copy of the data transfer session object 20(1) can also run the executable content to access and display the show.

Further, the PDA 14(1) executes the appropriate instructions included in the server controller object 22(2) for generating and displaying a user interface specific for the server 12, such as the buttons 34 shown in FIG. 8, which may be interacted with by users to enable them to advance the slides associated with the PDA 14(1). Additionally, the PDA 14(1) may send a notification to the server 12 that it has generated a user interface using a TCP/IP communication protocol, although other protocols can be used, such as RPC, CORBA, SOAP and RMI. Once the server 12 has sent all of the data to the PDA 14(1) or otherwise desires terminating the data transfer, the communication between the server 12 and the PDA 14(1) is terminated.

Further, the PDA 14(1) executes the appropriate instructions included in the data-type-handler-controller object for generating and displaying a user interface specific for the server 12, such as the buttons 34 shown in FIG. 8, which may be interacted with by users to enable them to advance the slides associated with the PDA 14(1). Additionally, the PDA 14(1) may send a notification to the server 12 that it has generated a user interface using a TCP/IP communication protocol, although other protocols can be used, such as RPC, CORBA, SOAP and RMI. Once the server 12 has sent all of the data to the PDA 14(1) or otherwise desires terminating the data transfer, the communication between the server 12 and the PDA 14(1) is terminated.

Referring to FIGS. 4 and 7, the server 12 also transmits data to the projector 16 through the data transfer session object 20(3). The projector 16 may be programmed to automatically begin retrieving data from the server 12 as soon as the data transfer session object 20(3) is received from the PDA 14(1), as described above in connection with step 4200, upon detecting that data is being sent from the server 12, or upon receiving a signal from the PDA 14(1) indicating a user's desire to begin data transfer. The projector 16 projects the images represented by the data being received.

In the example provided above at step 1000, the projector 16 may receive from the server 12 data representing the MS PowerPoint™ slides to be displayed by the projector 16. Thus, the projector 16 executes the operations and instructions included in the data type handler object 24(3), described above at step 5000, to be able to understand and interact with the data. Additionally, the PDA 14(1) executes the appropriate instructions included in the projector controller object 26(3) for generating and displaying the sound control interface 36 that may be utilized by the users to control projector 16 volume.

Further, the PDA 14(1) may send a notification to the projector 16 that it has generated a user interface or that it no longer needs the projector controller object 26(3) for the data transfer so that the projector 16 may become available for participating in data transfers or other types of communications with other components. Once the PDA 14(1) has sent all of the data to the projector 16 or otherwise desires terminating the data transfer, the communication between the server 12, PDA 14(1) and the PDA 16 is terminated and the process ends.

As described above in connection with one or more embodiments, the present invention provides a system 10 that uses controller objects to enable arbitrary components, such as PDA 14(1), to control aspects of communications, such as data transfers, without needing to have prior knowledge of any of the other components involved in the communication, such as server 12 and projector 16. Moreover, the system 10 enables arbitrary components, such as server 12 and projector 16, to dynamically provide user interfaces to other components, such as one or more of the PDAs 14(1)-PDA 14(n), as needed to enable the recipients to control the communication without needing to have prior knowledge of the components creating or providing the interfaces. As a result, the PDA 14(1) can control a program, such as a slide show application operating on the server 12. Moreover, the PDA 14(1) can control a projector 16 that projects the slides of the slide show program, such as to adjust the volume of the projectors 16 where audio output is involved.

Other modifications of the present invention may occur to those skilled in the art subsequent to a review of the present application, and these modifications, including equivalents thereof, are intended to be included within the scope of the present invention. Further, the recited order of processing elements or sequences, or the use of numbers, letters, or other designations therefore, is not intended to limit the claimed processes to any order except as may be specified in the claims.

What is claimed is:

1. A method comprising:
    performing a discovery process, wherein the discovery process locates components that are in communication with each other;
    obtaining at a first component proxy objects from the discovered components;
    determining at the first component the interfaces that are implemented by each proxy object;
    establishing communications by the first component with the discovered components using the determined interfaces;
    receiving at the first component a data transfer object from at least one component, wherein the data transfer object facilitates transfers between components;
    transferring by the first component the data transfer object to the discovered components so that the discovered components can communicate with each other;
    obtaining at the first component at least one controller object from at least one of at least two components involved in a communication, wherein the first component requests the at least one controller object from the at least one of the at least two components;
    executing at the first component at least one instruction associated with at least one obtained controller object; and
    controlling at the first component the communication between the at least two components based on the executed instruction;
    wherein the components discover one another and interact without prior knowledge of one another and/or the assignment of pre-determined roles.

2. The method as set forth in claim 1 wherein the at least two components comprise the first component and a second component, or a second component and a third component.

3. The method as set forth in claim 1 wherein executing at least one instruction further comprises executing at least one mobile code instruction to generate and display a user interface.

4. The method as set forth in claim 1 further comprising receiving at the at least one of the components an asynchronous notification indicating that the at least one controller object has been obtained, or receiving at the at least one of the components an asynchronous notification indicating a change in a status of the at least one obtained controller object.

5. The method as set forth in claim 1 further comprising sending an acknowledgment from the first component to one of the components that created the at least one obtained controller object upon a set amount of time elapsing to renew a controller object lease.

6. The method as set forth in claim 1 further comprising receiving at the at least one of the components at least one data type handler object from at least one of the components.

7. The method as set forth in claim 6 wherein the data type handler object further comprises at least one data-type-handler-controller object.

8. A computer-readable medium having stored thereon instructions, which when executed by at least one processor, causes the at least one processor to perform:
    a discovery process, wherein the discovery process locates components that are in communication with each other;
    obtaining at a first component proxy objects from the discovered components;
    determining at the first component the interfaces that are implemented by each proxy object;
    establishing communications by the first component with the discovered components using the determined interfaces;
    receiving at the first component a data transfer object from at least one component, wherein the data transfer object facilitates transfers between components;
    transferring by the first component the data transfer object to the discovered components so that the discovered components can communicate with each other;
    obtaining at the first component at least one controller object from at least one of at least two components involved in a communication, wherein the first component requests the at least one controller object from the at least one of the at least two components;
    executing at the first component at least one instruction associated with at least one obtained controller object; and
    controlling at the first component communication between the at least two components based on the executed instruction;
    wherein the components discover one another and interact without prior knowledge of one another and/or the assignment of pre-determined roles.

9. The medium as set forth in claim 8 wherein the at least two components comprise the first component and a second component, or a second component and a third component.

10. The medium as set forth in claim 8 wherein executing at least one instruction further comprises executing at least one mobile code instruction to generate and display a user interface.

11. The medium as set forth in claim 8 further comprising receiving at the at least one of the components an asynchronous notification indicating that the at least one controller object has been obtained, or receiving at the at least one of the components an asynchronous notification indicating a change in a status of the at least one obtained controller object.

12. The medium as set forth in claim 8 further comprising sending an acknowledgment from the first component to one of the components that created the at least one obtained controller object upon a set amount of time elapsing to renew a controller object lease.

13. The medium as set forth in claim 8 further comprising receiving at the at least one of the components at least one data type handler object from at least one of the components.

14. The medium as set forth in claim 13 wherein the data type handler object further comprises at least one data-type-handler-controller object.

15. A computing system comprising:
    a discovery mechanism embedded in a computing component, wherein the computing component comprises a hardware device executing the discovery mechanism, wherein the discovery mechanism locates components that are in communication with each other, a first component in a plurality of components, the first component has at least one controller object, each at least one controller object is associated with at least one of the plurality of components, each at least one controller object is associated with at least one instruction which when executed by the first component enables the first component to control communication between at least two of the plurality of components, wherein the first component requests the at least one controller object from the at least one of the plurality of components;

a communication mechanism embedded in a computing component, wherein the computing component comprises a hardware device executing the communication mechanism configured to:

obtain at a first component proxy objects from the discovered components;

determine at the first component the interfaces that are implemented by each proxy object;

establish communications by the first component with the discovered components using the determined interfaces;

receive at the first component a data transfer object from at least one component, wherein the data transfer object facilitates transfers between components;

transfer by the first component the data transfer object to the discovered components so that the discovered components can communicate with each other;

wherein the components discover one another and interact without prior knowledge of one another and/or the assignment of pre-determined roles.

16. The system as set forth in claim 15 further comprising a second component that has a copy of the at least one controller object, the copy associated with at least one instruction which when executed by the second component enables the second component to control the communication.

17. The system as set forth in claim 15 wherein the plurality of components comprise the first component and a second component, or a second component and a third component.

18. The system as set forth in claim 15 wherein the at least one instruction further comprises at least one mobile code instruction to generate and display a user interface, the at least one mobile code instruction is specific to a creator of the at least one controller object.

19. The system as set forth in claim 15 wherein at least one of the plurality of components has an asynchronous notification which indicates that the at least one controller object has been obtained by at least one other of the components, or at least one of the plurality of components has an asynchronous notification which indicates a change in a status of the at least one controller object.

20. The system as set forth in claim 15 wherein at least one of the plurality of components has at least one data type handler object from at least one of the components.

21. The system as set forth in claim 20 wherein the data type handler object further comprises at least one data-type-handler-controller object.

22. A method comprising:

performing a discovery process, wherein the discovery process locates components that are in communication with each other;

obtaining at a first component proxy objects from the discovered components;

determining at the first component the interfaces that are implemented by each proxy object;

establishing communications by the first component with the discovered components using the determined interfaces;

receiving at the first component a data transfer object from at least one component, wherein the data transfer object facilitates transfers between components;

transferring by the first component the data transfer object to the discovered components so that the discovered components can communicate with each other;

creating at the first component at least one controller object for communication involving at least two components;

sending the at least one controller object from the first component to at least one of the two components, wherein the sending is in response to a request which is generated by the at least one of the two components and which is directed to the first component;

accepting at the first component at least one command from the at least one of the two components which executes at least one instruction associated with at least one sent controller object; and controlling at the first component the communication between the at least two components based on the at least one command;

wherein the components discover one another and interact without prior knowledge of one another and/or the assignment of pre-determined roles.

23. The method as set forth in claim 22 wherein creating at a first component at least one controller object further comprises associating the at least one created controller object with at least one mobile code instruction for generating and displaying a user interface.

24. The method as set forth in claim 22 further comprising sending an asynchronous notification from the first component to at least one of the components indicating that the at least one controller object has been created, sending an asynchronous notification to at least one of the components indicating that the at least one controller object has been sent, or sending an asynchronous notification to at least one of the components indicating a change in a status of the at least one controller object.

25. The method as set forth in claim 22 further comprising receiving an acknowledgment at the first component from at least one of the components provided with the at least one created controller object, the acknowledgment being received upon a set amount of time elapsing to renew a controller object lease.

26. The method as set forth in claim 22 further comprising sending at least one data type handler object from the first component to at least one of the two components.

27. The method as set forth in claim 26 wherein the data type handler object further comprises at least one data-type-handler-controller object.

28. A computer-readable medium having stored thereon instructions, which when executed by at least one processor, causes the at least one processor to perform:

a discovery process, wherein the discovery process locates components that are in communication with each other;

obtaining at a first component proxy objects from the discovered components;

determining at the first component the interfaces that are implemented by each proxy object;

establishing communications by the first component with the discovered components using the determined interfaces;

receiving at the first component a data transfer object from at least one component, wherein the data transfer object facilitates transfers between components;

transferring by the first component the data transfer object to the discovered components so that the discovered components can communicate with each other;

creating at the first component at least one controller object for communication involving at least two components;

sending the at least one controller object from the first component to at least one of the two components, wherein the sending is in response to a request which is generated by the at least one of the two components and which is directed to the first component;

accepting at the first component at least one command from the at least one of the two components which executes at least one instruction associated with at least one sent controller object; and controlling at the first component the communication between the at least two components based on the at least one command;

wherein the components discover one another and interact without prior knowledge of one another and/or the assignment of pre-determined roles.

29. The medium as set forth in claim 28 wherein creating at a first component at least one controller object further comprises associating the at least one created controller object with at least one mobile code instruction for generating and displaying a user interface.

30. The medium as set forth in claim 28 further comprising sending an asynchronous notification from the first component to at least one of the components indicating that the at least one controller object has been created, sending an asynchronous notification to at least one of the components indicating that the at least one controller object has been sent, or sending an asynchronous notification to at least one of the components indicating a change in a status of the at least one controller object.

31. The medium as set forth in claim 28 further comprising receiving an acknowledgment at the first component from at least one of the components provided with the at least one created controller object, the acknowledgment being received upon a set amount of time elapsing to renew a controller object lease.

32. The medium as set forth in claim 28 further comprising sending at least one data type handler object from the first component to at least one of the two components.

33. The medium as set forth in claim 32 wherein the data type handler object further comprises at least one data-type-handler-controller object.

34. A computing system comprising:

a discovery mechanism embedded in a computing component, wherein the computing component comprises a hardware device executing the discovery mechanism, wherein the discovery mechanism locates components that are in communication with each other, a first component, the first component has at least one controller object accessible to at least one other component, the at least one controller object associated with at least one instruction which when executed by the at least one other component enables the at least one other component to control a communication involving the at least one other component, wherein the at least one other component obtains the at least one controller object from the first component;

a communication mechanism embedded in a computing component, wherein the computing component comprises a hardware device executing the communication mechanism configured to:

obtain at a first component proxy objects from the discovered components;

determine at the first component the interfaces that are implemented by each proxy object;

establish communications by the first component with the discovered components using the determined interfaces;

receive at the first component a data transfer object from at least one component, wherein the data transfer object facilitates transfers between components;

transfer by the first component the data transfer object to the discovered components so that the discovered components can communicate with each other;

wherein the components discover one another and interact without prior knowledge of one another and/or the assignment of pre-determined roles.

35. The system as set forth in claim 34 wherein the at least one controller object has at least one mobile code instruction to generate and display a user interface, the at least one mobile code instruction is specific to the first component.

36. The system as set forth in claim 34 wherein the at least one other component comprises the first component and a second component, or a second component and a third component.

37. The system as set forth in claim 34 wherein the at least one other component has an asynchronous notification which indicates that the at least one controller object has been created by the first component, the at least one other component has an asynchronous notification which indicates that the at least one controller object has been sent to the at least one other component, or the at least one other component has an asynchronous notification which indicates a change in a status of the at least one controller object.

38. The system as set forth in claim 34 wherein the first component has at least one data type handler object accessible to the at least one other component.

39. The system as set forth in claim 38 wherein the data type handler object further comprises at least one data-type-handler-controller object.

* * * * *